(12) United States Patent
Terry (10) Patent No.: US 7,881,266 B2
(45) Date of Patent: *Feb. 1, 2011

(54) WIRELESS COMMUNICATION SYSTEM WITH SELECTIVELY SIZED DATA TRANSPORT BLOCKS

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/539,901

(22) Filed: Aug. 12, 2009

(65) Prior Publication Data

US 2010/0027511 A1 Feb. 4, 2010

Related U.S. Application Data

(63) Continuation of application No. 11/363,809, filed on Feb. 28, 2006, which is a continuation of application No. 10/888,266, filed on Jul. 9, 2004, now Pat. No. 7,039,030, which is a continuation of application No. 09/759,553, filed on Jan. 12, 2001, now Pat. No. 6,807,192.

(60) Provisional application No. 60/176,150, filed on Jan. 14, 2000.

(51) Int. Cl.
H04B 7/216 (2006.01)
H04L 12/28 (2006.01)

(52) U.S. Cl. ............... 370/335; 370/342; 370/392
(58) Field of Classification Search ............ None
See application file for complete search history.

(56) References Cited

U.S. PATENT DOCUMENTS 6,128,322 A 10/2000 Rasanen et al.
6,307,867 B1 10/2001 Roobol et al.
6,477,670 B1 11/2002 Ahmadvand
6,519,266 B1 2/2003 Manning et al.
6,684,081 B2 1/2004 Sarkkinen et al.

(Continued)

FOREIGN PATENT DOCUMENTS

EP 0993148 4/2000

(Continued)

OTHER PUBLICATIONS

3GPP TSG-RAN Working Group 2 Meeting #10, Tdoc R2-00-057, (Jan. 2000).

(Continued)

*Primary Examiner*—Nittaya Juntima
(74) *Attorney, Agent, or Firm*—Volpe and Koenig, P.C.

(57) ABSTRACT

A wireless transmit receive unit and methods for code division multiple access telecommunications are disclosed that process data in a physical layer and a medium access control (MAC) layer. The physical and MAC layers communicate data between each other via transport channels. The transport channels are associated with logical channels. Logical-channel data for the transport channels is provided in data units having a bit size evenly divisible by an integer N. The respective logical channels associated with a transport channel utilize MAC headers that have a selected modulo N bit size such that there is bit alignment of the MAC headers of all the logical channels associated with a particular transport channel.

28 Claims, 4 Drawing Sheets

U.S. PATENT DOCUMENTS

| | | |
|---|---|---|
| 6,782,035 B1 | 8/2004 | Nakamura et al. |
| 6,791,963 B1 | 9/2004 | Hwang et al. |
| 6,950,420 B2 | 9/2005 | Sarkkinen et al. |
| 2004/0038691 A1 | 2/2004 | Shin |

FOREIGN PATENT DOCUMENTS

| | | |
|---|---|---|
| EP | 1104216 | 5/2001 |
| WO | 97/00568 | 1/1997 |
| WO | 98/47246 | 10/1998 |

OTHER PUBLICATIONS

3GPP TSG-RAN Working Group 2 Meeting #10, Tdoc R2-00-060, (Jan. 2000).

3GPP, "3$^{rd}$ Generation Partnership Project; Technical Specification Group Radio Access Network; Radio Resource Control (RRC); Protocol Specification (Release 1999)," 3GPP TS 25.331 V3.5.0 (Dec. 2000).

3GPP, "3$^{rd}$ Generation Partnership Project; Technical Specification Group Radio Access Network; Radio Resource Control (RRC); Protocol Specification (Release 1999)," 3GPP TS 25.331 V3.1.0 (Dec. 1999).

3GPP, "3$^{rd}$ Generation Partnership Project; Technical Specification Group Radio Access Network; Services provided by the physical layer (Release 1999)," 3GPP TS 25.302 V3.7.0 (Dec. 2000).

3GPP, "3$^{rd}$ Generation Partnership Project; Technical Specification Group Radio Access Network; Services provided by the physical layer (Release 1999)," 3GPP TS 25.302 V3.2.0 (Dec. 1999).

3GPP, "3$^{rd}$ Generation Partnership Project; Technical Specification Group Radio Access Network; RLC protocol specification (Release 1999)," 3GPP TS 25.322 V3.5.0 (Dec. 2000).

3GPP, "3$^{rd}$ Generation Partnership Project; Technical Specification Group Radio Access Network; RLC protocol specification (Release 1999)," 3GPP TS 25.322 Draft V3.1.0 (Dec. 1999).

3GPP, "3$^{rd}$ Generation Partnership Project; Technical Support Group Radio Access Network; Physical channels and mapping of transport channels onto physical channels (TDD) (Release 1999)," 3GPP TS 25.221 V3.1.0 (Dec. 1999).

3GPP, "3$^{rd}$ Generation Partnership Project; Technical Support Group Radio Access Network; Physical channels and mapping of transport channels onto physical channels (TDD) (Release 1999)," 3GPP TS 25.221 V3.5.0 (Dec. 2000).

3GPP, "3$^{rd}$ Generation Partnership Project; Technical Support Group Radio Access Network; MAC Protocol Specification (Release 1999)," 3GPP TS 25.321 v3.2.0 (Dec. 1999).

3GPP, "3$^{rd}$ Generation Partnership Project; Technical Support Group Radio Access Network; MAC Protocol Specification (Release 1999)," 3GPP TS 25.321 v3.6.0 (Dec. 2000).

Lettieri et al "Adaptive Frame Length Control for Improving Wireless Link Throughput, Range, and Energy Efficiency" Seventeenth Annual Joint Conference of the IEEE Computer and Communications Societies, vol. 2, Mar. 29-Apr. 2, 1998, pp. 564-571.

Sungwon et al. "The Design and Performance Evaluation of High-Speed Packet Data MAC Protocol for CDMA Based IMT2000" Global Communications Conference, vol. 5, 1999; pp. 2964-2698.

Third Generation Partnership Project Technical Specification Group, "RAN WG4 ULTRA FDD: Radio Transmission and Reception," TS 25.321, V3.0.0, (Jun. 1999), pp. 1-34.

Siemens et al., "RACH/FACH MAC Header Channel Type and MAC Signalling in TDD for USCH/DSCH Identification and Operation," 3GPP TSG-RAN meeting #6, R2-99941 (Aug. 16-20, 1999).

Third Generation Partnership Project, "Technical Specification Group Radio Access Network; Radio Interface Protocol Architecture (Release 1999)," 3GPP TS 25.301 V3.6.0 (Sep. 2000).

Third Generation Partnership Project, "Technical Specification Group Radio Access Network; Radio Interface Protocol Architecture (Release 1999)," 3GPP TS 25.301 V3.3.0 (Dec. 1999).

WIRELESS COMMUNICATION SYSTEM WITH SELECTIVELY SIZED DATA TRANSPORT BLOCKS

CROSS REFERENCE TO RELATED APPLICATIONS

This application is a continuation of U.S. patent application Ser. No. 11/363,809, filed Feb. 28, 2006, which is a continuation of U.S. patent application Ser. No. 10/888,266, filed Jul. 9, 2004, which issued as U.S. Pat. No. 7,039,030 on May 2, 2006, which is a continuation of U.S. patent application Ser. No. 09/759,553, filed Jan. 12, 2001, which issued as U.S. Pat. No. 6,807,192 on Oct. 19, 2004, which claims the benefit of U.S. Provisional Application No. 60/176,150, filed Jan. 14, 2000, all of which are incorporated by reference herein as if fully set forth.

FIELD OF INVENTION

The present invention relates to wireless communication systems and, in particular, the selective sizing of data blocks for wireless transport of data in an efficient manner.

BACKGROUND OF THE INVENTION

Radio interfaces such as those proposed by the 3rd Generation Partnership Project (3G) use Transport Channels (TrCHs) for transfer of user data and signaling between User Equipment (UE), such as a Mobile Terminal (MT), and a Base Station (BS) or other device within node of a communication network. Generically, UEs, MTs and BSs can be referred to as wireless transmit receive units (WTRUs).

In 3G Time Division Duplex (TDD), TrCHs are a composite of one or more physical channels defined by mutually exclusive physical resources. TrCH data is transferred in sequential groups of Transport Blocks (TBs) defined as Transport Block Sets (TBSs). Each TBS is transmitted in a given Transmission Time Interval (TTI). User Equipment (UE) and Base Station (BS) physical reception of TrCHs require knowledge of Transport Block (TB) sizes.

For each TrCH, a Transport Format Set (TFS) is specified containing Transport Formats (TFs). Each TF, defines a TBS composed of a specified number of TBs where each TB preferably has the same size within a given TBS. Thus, a finite number of potential TB sizes are defined with respect to each TrCH.

Radio Resource Control (RRC) signaling is required between the BS and UE to define the attributes of each established TrCH, including a list of potential TB sizes. Signaling over the radio interface introduces system overhead, which reduces the physical resources available for user data transmission. Therefore, it is important to minimize RRC signaling and the number of potential TrCH TB sizes respectively.

All data transferred by specific TrCHs must fit into the TB sizes specified for the TFS of a particular TrCH. However, variable size data blocks exist that can not be predicted, for Radio Access Network (RAN) and Core Network (CN) signaling data, as well as Non-Real Time (NRT) user data transmissions.

To allow for the transfer of variable size data blocks, a Radio Link Control (RLC) provides a segmentation and re-assembly multiplexing function and a padding function. The segmentation and re-assembly multiplexing function reduces the size prior to transmission and is used when the transferred data block is larger than the maximum allowed TB size. The padding function increases the data block or segmented data block size by padding with extra bits to fit a TB size.

Segmentation and re-assembly of data over more than one TTI is permitted for some, but not all, types of data. In 3G, it is not permitted, for example, for Common Control Channel (CCCH) logical data. Thus, the payload requirements for a TrCH carrying logical CCCH data are inherently restricted.

The RLC processing results in blocks of data called Protocol Data Units (PDUs). A certain amount of each RLC PDU is required for control information. Using a relatively small RLC PDU results in a lower transfer data to control information ratio consequently resulting in a less efficient use of radio resources. The RLC padding function is used when the transferred data block is not equal to any of the allowed TB sizes. Likewise, the greater the difference between the transferred data block size and the next larger allowed TB size results in lowering the transfer data to used physical resources ratio consequently resulting in a less efficient use of radio resources. Therefore, it is important to maximize the number of potential TB sizes.

Lowering the number of TB sizes reduces RRC signaling overhead and increases radio interface efficiency. Increasing the number of TB sizes reduces RLC overhead and increases radio interface efficiency. It is therefore important to make the best use of the specified TB sizes for each TrCH.

TB sizes are the sum of the RLC PDU size and a Medium Access Control (MAC) header size. The MAC header size is dependent on the class of traffic, which is indicated by the Logical Channel type. A Target Channel Type Field (TCTF) is provided in the MAC header to indicate to which logical channel a TB is assigned. A TrCH can support multiple logical channel types. This means that the finite number of allowed TB sizes must support several MAC header sizes.

For RAN and CN signaling data and NRT user data, the RLC generates octet aligned (8 bit quantities) PDU sizes. Thus, the RLC PDUs are defined as groups of a selected number of octets, such that the RLC PDU bit size is always evenly divided by eight, i.e. the RLC PDU bit size always equals 0 modulo 8. This characteristic is maintained even when padding is required.

Applicant has recognized that, if MAC header sizes for different Logical Channel types have mutually exclusive bit offsets, TB sizes can not be generically used for all transmissions. TB sizes have to be defined for specific MAC headers and logical channels respectively. This increases signaling overhead and reduces RLC PDU size options, which results in less efficient use of radio resources.

Specifying octet aligned MAC header sizes as is currently done in some 3rd generation systems allows for some sharing of TB sizes between different Logical Channel types, but also increases MAC signaling overhead since the MAC header size must be at least 8 bits in such situations. In 3rd generation TDD mode, certain TrCH and Logical Channel combinations have very limited transfer block sizes and increasing MAC overhead should be avoided. Therefore, in TDD, TB size definitions are specific to Logical Channel specific MAC header bit offsets, and as described, reduce overall radio resource efficiency.

Applicant has recognized that without common MAC header bit offsets, it is not possible for MT down-link and BS up-link transmissions to octet align received frames in a physical layer since the bit offset is based on the logical channel type which cannot be known while at the physical layer. Therefore, TB's have to be transferred to layer 2 for logical channel determination before bit shifting can occur. This means that considerable processing overhead is introduced for these TrCH's. Applicant has recognized that with TrCH specific bit aligned MAC headers, bit shifting is known at the physical layer and no additional processing overhead is introduced.

SUMMARY OF THE INVENTION

For wireless communication between WTRUs, such as between UEs and a base station, a CDMA telecommunication system utilizes a plurality of protocol layers including a physical layer and a medium access control (MAC) layer such that the MAC layer provides data to the physical layer via plurality of transport channels (TrCHs). Each transport channel (TrCH) is associated with a set of logical channels for transporting logical channel data within transport channel data. At least one TrCH is associated with a set of logical channels having at least two logical channels of different types.

The physical layer receives blocks of data for transport such that the transport blocks (TBs) of data includes a MAC header and logical channel data for one of the TrCHs. Each TB transports data for a given TrCH such that the logical channel data includes data associated with a selected logical channel from the set of logical channels associated with the given TrCH. Each TB has one of a selected limited finite number of TB bit sizes. The logical channel data for each TB has a bit size evenly divisible by a selected integer N greater than three (3). N is preferably eight (8) so that the logical data is in the form of an RLC PDU defined in terms of octets of data bits. Preferably the data manipulation and formatting is performed by one or more computer processors.

The MAC header for each TB includes data identifying the selected logical channel and has a bit size such that the MAC header bit size plus the logical channel data bit size equals one of the TB bit sizes. The MAC header bit size is fixed for TBs transporting data for the same TrCH and same selected logical channel, but may be different from the MAC header bit size for TBs transporting data for either a different TrCH or a different selected logical channel.

Preferably, for TrCHs associated with a set of multiple types of logical channels, a fixed MAC header bit size is associated with each logical channel within the set of logical channels and is selected such that each fixed MAC header bit size equals M modulo N where M is an integer greater than 0 and less than N. This results in a MAC header bit offset of M which is the same for all MAC headers associated with a given TrCH. This allows for a MAC header to be smaller than N in size. Thus, when N is 8, such as for octet aligned RLC PDUs, a MAC header can be smaller than one octet of data.

Preferably, each MAC header has a data field for data identifying the selected type of logical channel associated with the logical channel data. A bit size of that data field is preferably selected to determine the modulo N bit size of the MAC header, i.e. the MAC header bit offset. A shortest data field bit size is preferably provided for the data field of the MAC header of one or more logical channels of the set associated with the respective TrCH such that the logical channels designated by the shortest data field size are collectively more frequently used with the respective TrCH than any other logical channel within the associate set of logical channels. Alternatively, the shortest data field bit size may be associated with the most restricted TrCH logical channel combination payload requirement.

Preferably, the TrCHs includes a forward access channel (FACH) associated with a set of logical channels including a dedicated traffic channel (DTCH), a dedicated control channel (DCCH), a shared channel control channel (SHCCH), a common control channel (CCCH) and a common traffic channel (CTCH), and a random access channel (RACH) associated with a set of logical channels including the DTCH, the DCCH, the SHCCH and the CCCH. In such case, each MAC header preferably has a Target Channel Type Field (TCTF) for data identifying the selected logical channel type associated with the transport channel data where a bit size of the TCTF field is selected to determine the modulo N bit size M of the MAC header. The modulo N bit size M of the MAC header is preferably 3 modulo 8 for FACH and 2 modulo 8 for RACH.

The TCTF data field bit size is preferably 3 with respect to FACH MAC headers associated with the CCCH, CTCH, SHCCH and BCCH logical channels. The TCTF data field bit size is preferably 5 with respect to the FACH MAC headers associated with the DCCH and DTCH logical channels. The TCTF data field bit size is preferably 2 with respect to RACH MAC headers associated with the CCCH and SHCCH logical channels. The TCTF data field bit size is preferably 4 with respect to the RACH MAC headers associated with the DCCH and DTCH logical channels.

Where the TrCH bit offset is constant for all logical channel types supported for a given TrCH, the physical layer can pad the MAC header to octet align the UE DL and UTRAN UL. No padding indicator is needed in UL or DL since the padding is constant for the TrCH.

Other objects and advantages will be apparent to one of ordinary skill in the art from the following detailed description of a presently preferred embodiment of the invention.

DETAILED DESCRIPTION OF THE INVENTION

Figure 1:
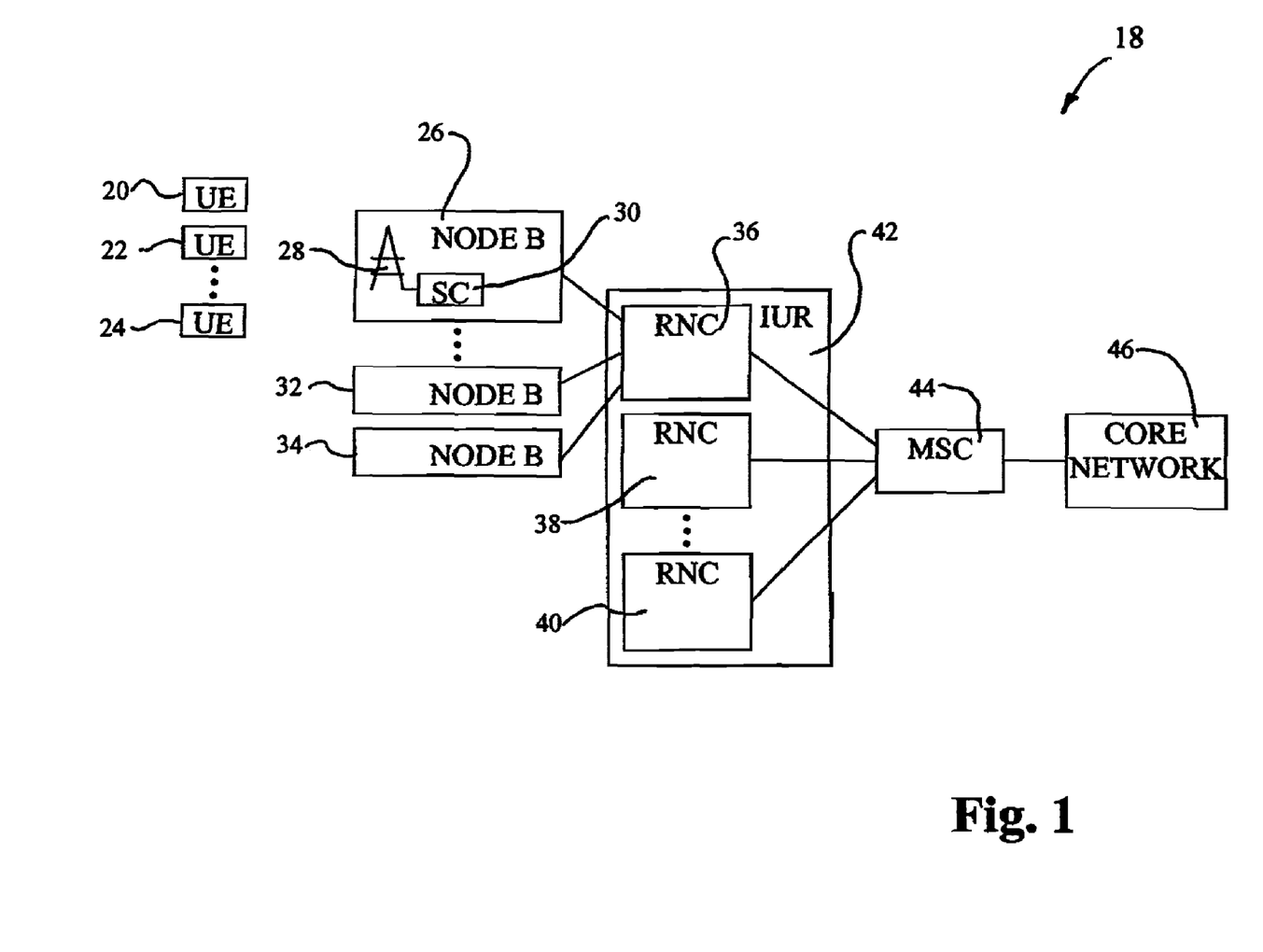
FIG. 1 is a simplified illustration of a wireless spread spectrum communication system.

FIG. 1 illustrates a simplified wireless spread spectrum code division multiple access (CDMA) communication system 18. A node b 26 within the system 18 communicates with associated user equipment (UE) 20-24 such as a mobile terminal (MT). The node b 26 has a single site controller (SC) 30 associated with either a single base station (BS) 28 (shown in FIG. 1) or multiple base stations. Generically, UEs, MTs and BSs can be referred to as wireless transmit receive units (WTRUs).

A group of node bs 26, 32, 34 is connected to a radio network controller (RNC) 36. To transfer communications between RNCs 36-40, an interface (IUR) 42 between the RNCs is utilized. Each RNC 36-40 is connected to a mobile switching center (MSC) 44 which in turn is connected to the Core Network (CN) 46.

To communicate within the system 18, many types of communication channels are used, such as dedicated, shared and common. Dedicated physical channels transfer data between a node b 26 and a particular UE 20-24. Common and shared channels are used by multiple UEs 20-24 or users. All of these channels carry a variety of data including traffic, control and signaling data.

Figure 2:
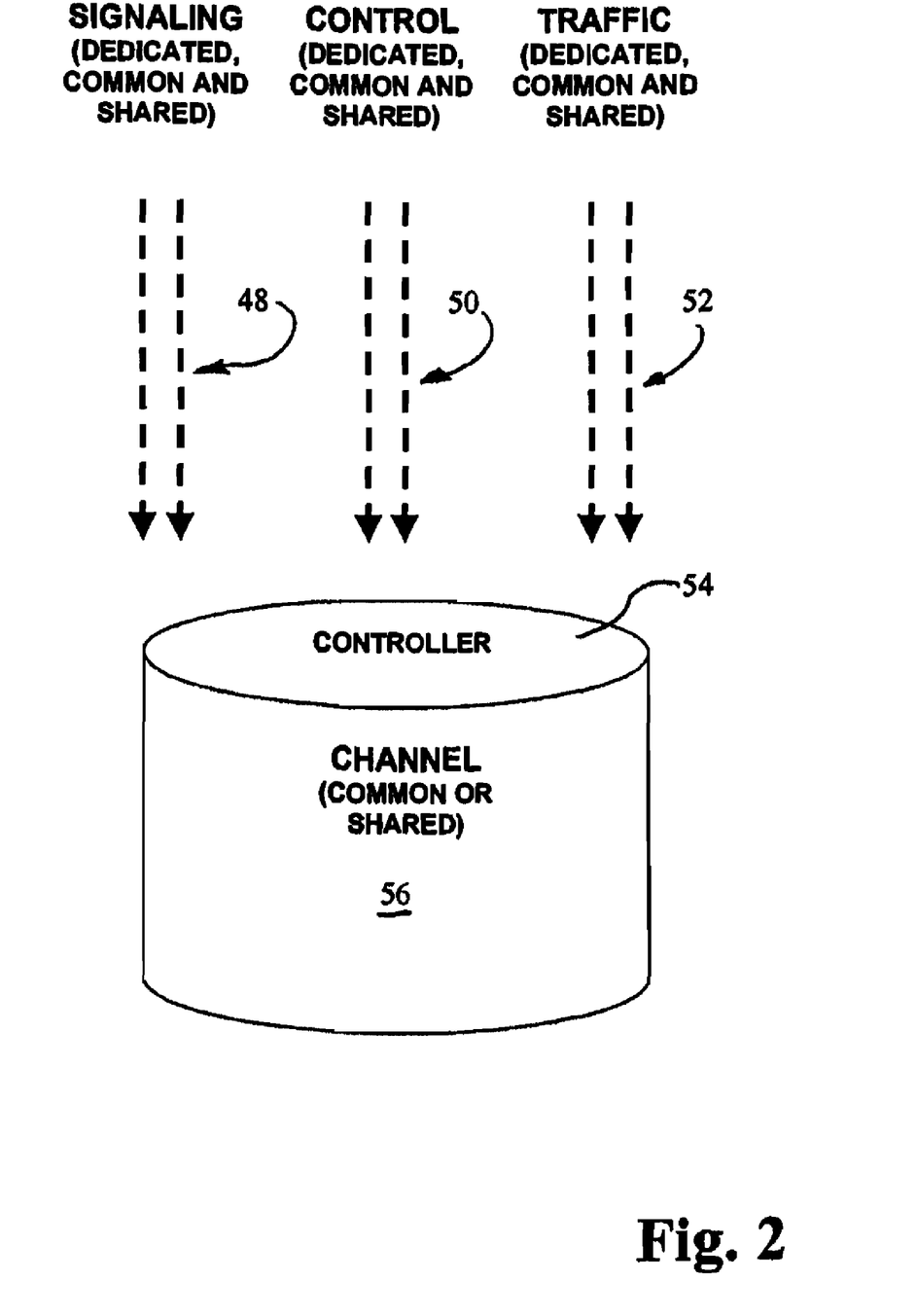
FIG. 2 is an illustration of data flowing into a common or shared channel.

Since shared and common channels carry data for different users, data is sent using protocol data units (PDUs) or packets. As shown in FIG. 2, to regulate the flow of data from differing sources 48, 50, 52 into a channel 56, a controller 54 is used.

Figure 3:
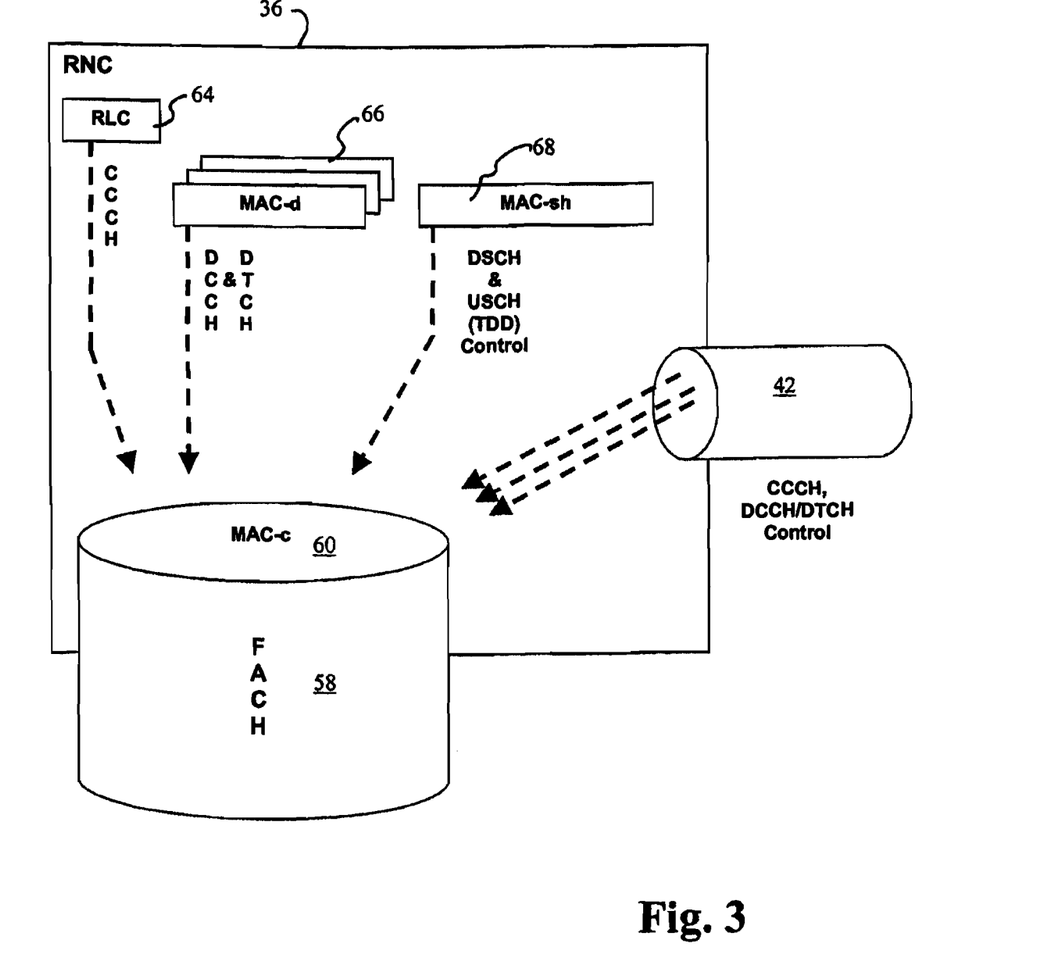
FIG. 3 is an illustration of data flowing into a FACH channel within a RNC.

One common channel used for transmitting data to the UEs 20-24 is a forward access channel (FACH) 58. As shown in FIG. 3, the FACH 58 originates in a RNC 36 and is sent to a node b 28-34 for wireless transmission as a spread spectrum signal to the UEs 20-24. The FACH 58 carries several data types from various sources, such as a common control channel (CCCH), dedicated control and traffic channel (DCCH and DTCH), and a downlink and uplink shared channel (DSCH and USCH) control signaling via a shared control logical channel (SHCCH). The FACH 58 also carries control signaling out of band and similar data transmitted via the IUR 42 from other RNCs 38-40, such as CCCH, DCCH and DTCH control data.

Various controllers are used by the RNC 36 to control the flow of data. A radio link controller (RLC) 64 handles the CCCH. A dedicated medium access controller (MAC-d) 66 handles the DCCH and the DTCH. A shared medium access controller (MAC-sh) 68 handles the DSCH, USCH control signaling. Controlling the FACH 58 is a common medium access controller (MAC-c) 60.

Figure 4:
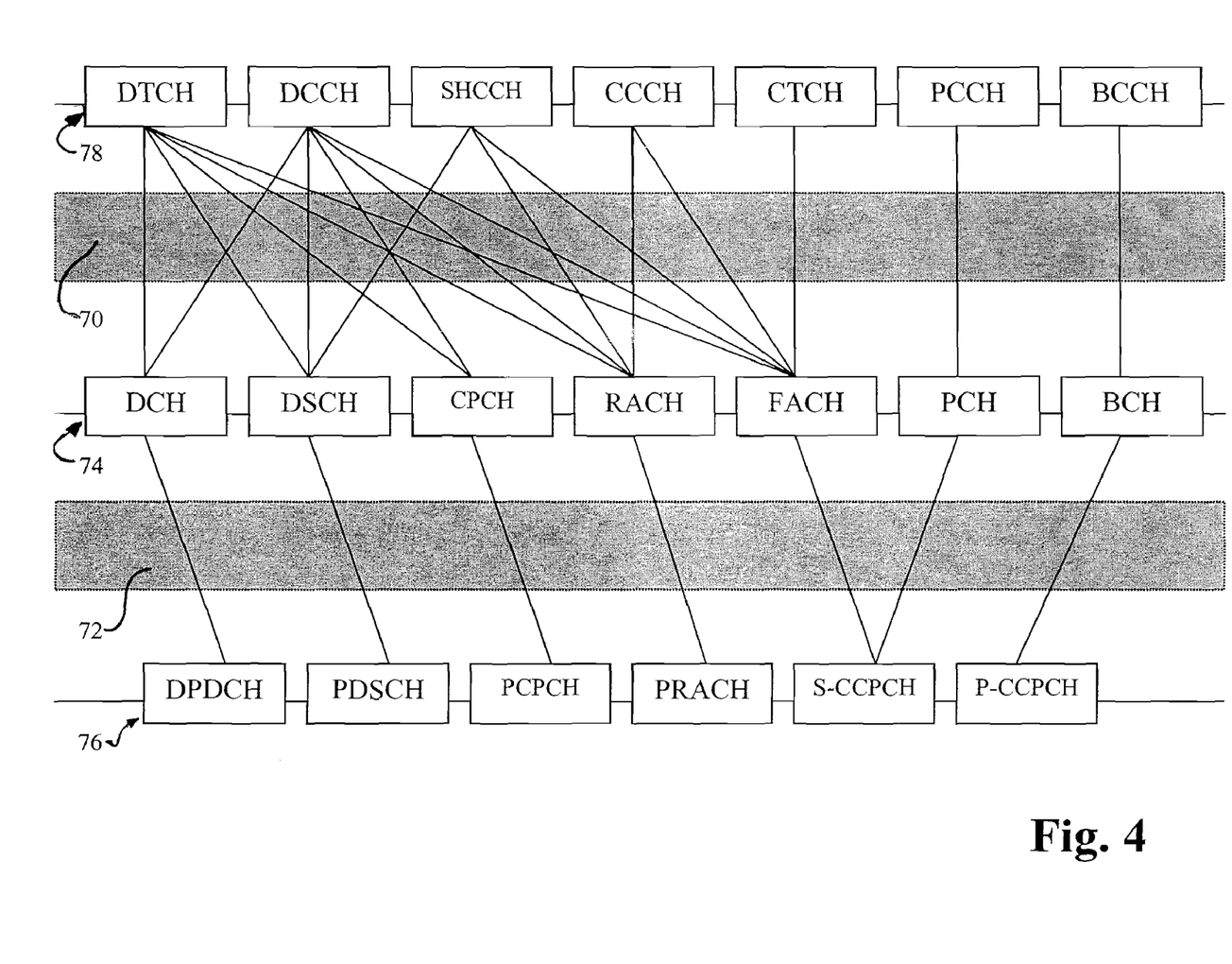
FIG. 4 is a schematic diagram illustrating a channel mapping with respect to a MAC layer and a physical layer in a communication system according to the teaching of the present invention.

With reference to FIG. 4, there is illustrated a preferred channel mapping with respect to the MAC layer 70 and the physical layer 72. The transport channels (TrCHs) 74 transport data over the physical layer 72 to associated physical channels 76. Each of the TrCHs 74 is associated with one or more logical channels 78. The TrCHs communicate by using transport blocks (TB) which are comprised of a MAC header and associated logical channel data in a RLC PDU. The MAC header has logical channel identification information. Preferably, the RLC PDU is defined by data octets, so that the RLC PDU bit size equals 0 modulo 8.

Preferably, the TrCHs 74 include a dedicated channel (DCH), a downlink shared channel (DSCH), a common packet channel (CPCH), a random access channel (RACH), a forward access channel (FACH), a paging channel (PCH) and a broadcast channel (BCH). The associated physical channels include a dedicated physical channel (DPDCH), a physical downlink shared channel (PDSCH), a physical common packet channel (PCPCH), a physical random access channel (PRACH), a secondary common control physical channel (SCCPCH) and a primary common control physical channel (PCCPCH). Other transport and physical channels may be supported, such as an uplink shared channel (USCH) with an associated physical uplink shared channel (PUSCH).

The logical channels preferably include a dedicated traffic channel (DTCH), a dedicated control channel (DCCH), a shared control channel (SHCCH), a common control channel (CCCH), a common traffic channel (CTCH), a paging control channel (PCCH) and a broadcast control channel (BCCH).

The preferred association of transport channels with physical and logical channels is illustrated in FIG. 4. For example, the FACH may transport data to the SCCPCH from any one of the set of logical channels including the DTCH, the DCCH, the SHCCH, the CCCH, or the CTCH. Similarly, the RACH transports data to the PRACH from any one of the set of logical channels including the DTCH, the DCCH, the SHCCH, or the CCCH.

In order to make efficient use of TBS size definitions, it is desirable to be able to use all specified TB sizes for all Logical Channel types supported by a respective TrCH. This allows the number of specified TFs for a TFS to be minimized thereby reducing signaling overhead, while maximizing the number of RLC PDU size options reducing the overhead associated with RLC segmentation and padding. TB and TBS assignment is accomplished without increasing MAC header sizes for TrCH logical channel combinations that support limited TB data payloads, i.e. the amount of data processed as a single unit from higher layers within MAC and RLC.

A bit aligned MAC header resolves both the radio resource efficiency issues associated with TB size signaling and RLC segmentation and padding overhead. The alignment is performed by maintaining the minimum size MAC headers for the Logical Channel and TrCH combinations that support limited TB data payload sizes, and increasing MAC headers for non-data payload size sensitive combinations to the same bit offset.

For example, if the data payload size limited combinations have MAC headers of X octets (total octets)+Y bit (extra bit offset, less than 8) sizes, and non-limited combination have headers of A octets+C bits and B octets+D bits. Then the C and D bits are adjusted to match Y bits. In some cases this means A and/or B octets must be incremented by one octet. It is not necessary for A and B octet sizes to match the X octet size since TB size=MAC header+RLC PDU and the octet aligned RLC PDU will conform to the available octet size. MAC headers less than an octet in length are permitted, and in fact desirable, in such cases X, A or B may be 0.

All TB sizes specified by RRC signaling for a specific TrCH channel will have a Y bit offset. That Y bit offset being applicable to the MAC headers for all Logical Channels supported by the specific TrCH. Since the MAC header octet sizes do not necessarily match between different Logical Channel types, RLC entities will correspondingly generate appropriate RLC PDU sizes to conform to the allowed TB sizes. This does not necessarily mean RLC PDU's have to be resized when switching between TrCH types, since it is always possible to adjust the difference in MAC header size between the new and old TrCH's in the allowed TB sizes.

With bit aligned MAC headers, each TrCH type may have a different bit aligned TB size offset. The offset is preferably defined by the most limited Logical Channel and TrCH combination block size, which is specific to the TrCH type. Therefore, each TrCH type has an independent optimized MAC header bit offset.

The invention has the additional benefit of removing processor intensive layer 2 bit shifting requirements in the WTRUs, such as the UE and BS equipment. With a common TB size bit offset for all Logical Channels types supported by a specific TrCH, it is possible for received radio transmissions to be bit shifted by the physical layer according to higher layer requirements. It is advantageous to provide bit shifting at the physical layer which is already involved in bit manipulations without adding additional overhead, as opposed to adding this requirement to the higher layer processing requirements.

In 3G system design, RLC and Radio Resource Control (RRC) entities generate and expect to receive data blocks which start on octet boundaries. If MAC headers for specific TrCH's have variable bit offsets it is only possible to avoid bit shifting in BS down-link and MT up-link transmissions. In the MT down-link and BS up-link cases it is not possible for the physical layer to be aware of the higher layer logical channel type that defines the bit offset. Only if the bit offset is common for all transmissions across the specific transport channel can bit processing be avoided in communication layers 2 and 3.

RRC Transport Format Set (TFS) signaling is used to define Transport Block (TB) sizes for each defined Transport Format (TF) allowed on a specific TrCH. The number of possible TB sizes should be minimized to reduce the signaling load. It is also necessary to choose TB sizes wisely since RLC PDU padding can dramatically increase transmission overhead.

Preferably, there is a maximum of 32 possible TB sizes in each TrCH's TFS. Specifying all 32 results in a significant signaling load that should be avoided. Although it is also important to have as many choices as possible on transport channels which have variable transmissions since RLC Acknowledged Mode (AM) and Unacknowledged Mode (UM) PDU's will be padded to match the next larger TB size when the previous lower size is exceeded.

The relation between RLC PDU and TB sizes is as follows: TB Size =MAC Header Size+RLC PDU Size.

In the preferred RLC AM and UM, the PDU size is always octet aligned and in Time Division Duplex (TDD) a variable non-octet aligned MAC header exists. Therefore, MAC individual bit offsets must be taken into account when specifying the allowed TB sizes.

In TDD, with the exception of DTCH/DCCH all logical channel combinations on the FACH and separately on the RACH are modified from the prior art to have the same bit offset (+2 bits for RACH and +3 bits for FACH when multiple logical channels are allowed). Table 1 reflects a preferred prior art MAC header size specification.

With the prior art MAC header definitions, octet aligned AM and UM RLC payloads will result in two possible TB size bit offsets on RACH and FACH when multiple logical channel types are applied. Octet+1 or 3 bits for FACH and octet+0 or 2 bits for RACH. This potentially doubles the number of Transport Formats that need to be specified on RACH and FACH.

TABLE 1

Prior Art TDD RACH/FACH MAC Header Sizes by Logical Channel Type

| Logical CH | TrCH | TCTF Field | UE-id Type | UE-id | C/T Field | Header Size |
|---|---|---|---|---|---|---|
| DCCH/DTCH | FACH | 3 | 2 | 16/32 | 4 | 25/41 |
| CCCH | FACH | 3 | N/A | N/A | N/A | 3 |
| CTCH | FACH | 3 | N/A | N/A | N/A | 3 |
| SHCCH | FACH | 0/3 (Note 1) | N/A | N/A | N/A | 0/3 |
| BCCH | FACH | 3 | N/A | N/A | N/A | 3 |
| DCCH/DTCH | RACH | 2 | 2 | 16 | 4 | 24 |
| CCCH | RACH | 2 | N/A | N/A | N/A | 2 |
| SHCCH | RACH | 0/2 (Note 1) | N/A | N/A | N/A | 0/2 |

(Note 1):
SHCCH does not require TCTF when SHCCH is the only channel assigned to RACH or FACH.

To increase the efficiency of TFS signaling and allow for more RLC PDU size choices, it is necessary to have a common TB size bit offset. Increasing MAC header sizes for CCCH, SHCCH, CTCH and BCCH, should be avoided since these channels operate in RLC TM where RLC segmentation across multiple radio frame TTIs is not possible. Therefore, the preferred solution is to increase the DCCH/DTCH TCTF by 2 bits on RACH and FACH. A preferred coding is reflected in Tables 2 and 3 below, respectively for FACH and RACH. This results in common RACH TB sizes of octet+2, i.e. 2 modulo 8, and FACH TB sizes of octet+3, i.e. 3 modulo 8.

Another benefit of MAC header bit alignment is the ability to remove the UE and RNC layer 2 bit shifting requirement. The RLC generates and expects to receive octet aligned PDU's. With variable bit shifted MAC headers only the UTRAN Down Link (DL) and UE Up Link (UL) MAC PDU's could avoid layer 2 bit shifting by padding the MAC header and providing a padding indicator to the physical layer. This is not possible for the UE DL and UTRAN UL transmissions since physical layer is unaware of the logical channel type on RACH and FACH.

If the TrCH bit offset is constant for all logical channel types supported for a given TrCH, the physical layer can pad the MAC header to octet align the UE DL and UTRAN UL. No padding indicator is needed in UL or DL since the padding is constant for the TrCH. For example, a presently preferred embodiment described above has common RACH TB sizes of octet+2, i.e. 2 modulo 8, and FACH TB sizes of octet+3, i.e. 3 modulo 8. Thus it necessarily follows that TB padding of 6 bits for all RACH logical channels and TB padding of 5 bits for all FACH logical channels results in octet alignment for UL and DL transmissions with respect to the embodiment of the invention described above.

The number of TFs specifying TB sizes allowed in each TFS on a specific TrCH should be minimized to reduce the layer 3 signaling load. It is also necessary to allow a maximum number of octet aligned RLC PDU sizes in AM and UM for efficient transfer of DCCH/DTCH data. In TDD mode bit shifted MAC headers potentially doubles the number of TFs that need to be defined on RACH and FACH TrCHs. Additionally, variable bit shifted MAC headers result in requiring layer 2 bit shifting for all UE DL and UTRAN UL transmissions on RACH and FACH. MAC header bit alignment is defined to avoid duplication of TB size definitions for octet aligned RLC PDUs and layer 2 bit shifting. As in the prior art, the MAC header preferably includes a Target Channel Type Field (TCTF). The TCTF field is a flag that provides identification of the logical channel type on FACH and RACH transport channels, i.e. whether it carries BCCH, CCCH, CTCH, SHCCH or dedicated logical channel information. Unlike the prior art, the preferred size and coding of TCTF for TDD are shown in Tables 2 and 3.

TABLE 2

Coding of the Target Channel Type Field on FACH for TDD

| TCTF | Designation |
|---|---|
| 000 | BCCH |
| 001 | CCCH |
| 010 | CTCH |
| 01100 | DCCH or DTCH Over FACH |
| 01101-01111 | Reserved (PDUs with this coding will be discarded by this version of the protocol) |
| 100 | SHCCH |
| 101-111 | Reserved (PDUs with this coding will be discarded by this version of the protocol) |

TABLE 3

Coding of the Target Channel Type Field on RACH for TDD

| TCTF | Designation |
|---|---|
| 00 | CCCH |
| 0100 | DCCH or DTCH Over RACH |
| 0101-0111 | Reserved (PDUs with this coding will be discarded by this version of the protocol) |
| 10 | SHCCH |

TABLE 3-continued

Coding of the Target Channel Type Field on RACH for TDD

| TCTF | Designation |
|------|-------------|
| 11   | Reserved (PDUs with this coding will be discarded by this version of the protocol) |

Note that the preferred size of the TCTF field of FACH for TDD is either 3 or 5 bits depending on the value of the 3 most significant bits. The preferred TCTF of the RACH for TDD is either 2 or 4 bits depending on the value of the 2 most significant bits.

Bit aligned MAC headers allow common TB sizes to be defined for different logical channels on the same TrCH. Common TB sizes reduce signaling overhead and potentially increase the options for RLC PDU sizes, which increases system efficiency by reducing the need for padding in AM and UM.

This is especially important for RACH and FACH channels where a common TrCH supports many different traffic types. Optimally for RACH and FACH, each TB size specified can apply to DCCH, CCCH, CTCH, SHCCH and DTCH. To allow this capability in octet mode it is preferred to specify the total number of octets not just the number of RLC PDU octets.

By specifying the total number of octets, it is not necessary to indicate the TDD MAC header type on common channels since the header offset is the same for all logical channel types. It is also possible to avoid RLC PDU resizing transport channel switching by taking into account the change in MAC header octet offset.

Table 4 is a preferred specification for a Transport Format Set (TFS) in a 3G system.

TABLE 4

Transport Format Set (TFS)

| Information Element/Group name | Need | Multi | Type and reference | Semantics description |
|---|---|---|---|---|
| CHOICE Transport channel type | MP | | | |
| >Dedicated transport channels | | | | The transport channel that is configured with this TFS is of type DCH |
| >>Dynamic Transport Format Information | MP | 1 to <maxTF> | | Note 1 |
| >>>RLC Size | MP | | Integer (0 . . . 4992) | Unit is bits Note 2 |
| >>>Number of TBs and TTI List | MP | 1 to <maxTF> | | Present for every valid number of TB's (and TTI) for this RLC Size. |
| >>>>Transmission Time Interval | CV-dynamic TTI | | Integer (10, 20, 40, 80) | Unit is ms. |
| >>>>Number of Transport blocks | MP | | Integer (0 . . . 512) | Note 3 |
| >Common transport channels | | | | The transport channel that is configured with this TFS is of a type not equal to DCH |
| >>Dynamic Transport Format Information | MP | 1 to <maxTF> | | Note |
| >>>RLC Size | MP | | Integer (0 . . . 4992) | Unit is bits Note 2 |
| >>>Number of TBs and TTI List | MP | 1 to <maxTF> | | Present for every valid number of TB's (and TTI) for this RLC Size. |
| >>>>Number of Transport blocks | MP | | Integer (0 . . . 512) | Note 3 |
| >>>>CHOICE mode | MP | | | |
| >>>>>FDD | | | | (no data) |
| >>>>>TDD | | | | |
| >>>>> Transmission Time Interval | CV-dynamic TTI | | Integer (10, 20, 40, 80) | Unit is ms. |
| >>>CHOICE Logical Channel List | MP | | | The logical channels that are allowed to use this RLC Size |
| >>>>ALL | | | Null | All logical channels mapped to this transport channel. |

TABLE 4-continued

Transport Format Set (TFS)

| | | | |
|---|---|---|---|
| >>>>Configured | | Null | The logical channels configured to use this RLC size in the RB mapping info. 10.3.4.21 if present in this message or in the previously stored configuration otherwise |
| >>>>Explicit List | | 1 to 15 | Lists the logical channels that are allowed to use this RLC size. |
| >>>>>RB Identity | MP | RB identity 10.3.4.16 | |
| >>>>>Logical Channel | CV-UL-RLC Logical Channels | Integer (0 ... 1) | Indicates the relevant UL logical channel for this RB. "0" corresponds to the first, "1" corresponds to the second UL logical channel configured for this RB in the IE "RB mapping info". |
| >>Semi-static Transport Format Information | MP | Semi-static Transport Format Information 10.3.5.11 | |

| Condition | Explanation |
|---|---|
| DynamicTTI | This IE is included if dynamic TTI usage is indicated in IE Transmission Time Interval in Semi-static Transport Format Information. Otherwise it is not needed. |
| UL-RLCLogicalChannels | If "Number of uplink RLC logical channels" in IE "RB mapping info" in this message is 2 or the IE "RB mapping info" is not present in this message and 2 UL logical channels are configured for this RB, then this IE is present. Otherwise this IE is not needed. |

NOTE:
The parameter "rate matching attribute" is in line with the RAN WG1 specifications. However, it is not currently in line with the description in 25.302.
NOTE 1:
The first instance of the parameter Number of TBs and TTI List within the Dynamic transport format information correspond to transport format 0 for this transport channel, the second to transport format 1 and so on. The total number of configured transport formats for each transport channel does not exceed <maxTF>.
NOTE 2:
For dedicated channels, 'RLC size' reflects RLC PDU size. In FDD for common channels 'RLC size' reflects actual TB size. In TDD for common channels since MAC headers are not octet aligned, to calculate TB size the MAC header bit offset is added to the specified size (similar to the dedicated case). Therefore for TDD DCH TrCHs the 4 bit C/T is added if MAC multiplexing is applied, for FACH the 3 bit TCTF offset is added and for RACH the 2 bit TCTF offset is added.
NOTE 3:
If the number of transport blocks <>0, and Optional IE "CHOICE RLC mode" or "CHOICE Transport block size is absent, it implies that no RLC PDU data exists but only parity bits exist. If the number of transport blocks = 0, it implies that neither RLC PDU data nor parity bits exist. In order to ensure the possibility of CRC based Blind Transport Format Detection, UTRAN should configure a transport format with number of transport block <>0, with a zero-size transport block.

In summary, the invention provides an improvement to a CDMA telecommunication system that has a physical layer and a MAC layer, with the MAC layer providing data to the physical layer via a plurality of transport channels utilizing data transfer blocks of specific sizes for each channel, with each transport channel associated with a set of logical channels where for at least one transfer channel the set of logical channels has at least two logical channels with different logical types. One implementation of the invention is preferably in the form of a processor for associating, for a given transport channel associated with a logical channel set having two (2) different types of logical channels, a fixed MAC header bit size with each logical channel within the set with each fixed MAC header bit size equal M modulo N where N is a selected integer greater than three (3) and M is an integer greater than zero (0) and less than N. The processor is configured to select a logical channel having logical-channel data for transport from a set of logical channels associated with the given transport channel, with the logical-channel data for each transport block having a bit size evenly divisible N. The processor also provides the logical-channel data from the MAC layer to the physical layer via the given transport channel as a plurality of transport-blocks of data, with each transport block of data including a MAC header and logical-channel data for the transport given channel, with each transport block of data having one of a finite number of transport block (TB) bit sizes, with a first bit size of a first MAC header set to a first fixed size for transport blocks transporting data for the same transport channel and same selected logical-channel data, with the first bit size of the MAC header plus the first bit size of the logical-channel data equal to one of the TB bit sizes, and with a second bit size of a second MAC header set to a second fixed size for transport blocks transporting data for a different transport channel or different selected logical-channel data, with the second bit size of the MAC header plus the second bit size of the different logical-channel data equal to one of the TB bit sizes.

REFERENCES

3GPP TSG-RAN Working Group 2 Meeting #10, Tdoc R2-00-057
3GPP TSG-RAN Working Group 2 Meeting #10, Tdoc R2-00-060

The following is a listing of acronyms and their meanings as used herein:

| | |
|---|---|
| AM | Acknowledged Mode |
| BCCH | Broadcast Control Channel |
| BCH | Broadcast Channel |
| BS | Base Station |
| CCCH | Common Control Channel |
| CDMA | Code Division Multiple Access |
| CN | Core Network |
| CPCH | Common Packet Channel |
| CTCH | Common Traffic Channel |
| DCCH | Dedicated Control Channel |
| DCH | Dedicated Channel |
| DL | Down Link |
| DPDCH | Dedicated Physical Channel |
| DPSCH | Physical Downlink Shared Channel |
| DSCH | Downlink Shared Channel |
| DTCH | Dedicated Traffic Channel |
| FACH | Forward Access Channel |
| MAC | Medium Access Control |
| MAC-c | Common Medium Access Control |
| MAC-d | Dedicated Medium Access Control |
| MAC-sh | Shared Medium Access Control |
| MSC | Mobile Switching Center |
| MT | Mobile Terminal |
| NRT | Non-Real Time |
| PCCPCH | Primary Common Control Physical Channel |
| PCH | Paging Channel |
| PCPCH | Physical Common Packet Channel |
| PDU | Protocol Data Units |
| PRACH | Physical Random Access Channel |
| PUSCH | Physical Uplink Shared Channel |
| RACH | Random Access Channel |
| RAN | Radio Access Network |
| RLC | Radio Link Control |
| RNC | Radio Network Controller |
| RRC | Radio Resource Control |
| SC | Site Controller |
| SCCPCH | Secondary Common Control Physical Channel |
| SHCCH | Shared Channel Control Channel |
| TB | Transport Block |
| TCTF | Target Channel Type Field |
| TDD | Time Division Duplex |
| TF | Transport Format |
| TFS | Transport Format Set |
| TrCH | Transport Channel |
| UE | User Equipment |
| UL | Up Link |
| UM | Unacknowledged Mode |
| USCH | Uplink Shared Channel |
| WTRU | Wireless Transmit Receive Unit |

What is claimed is:

1. A wireless transmit receive unit (WTRU) for code division multiple access (CDMA) telecommunications comprising:
a processor configured to process data in a physical layer and a medium access control (MAC) layer such that the MAC layer communicates data with the physical layer via a plurality of transport channels, where one transport channel is a forward access channel (FACH) associated with a set of logical channels including:
at least one of a dedicated traffic channel (DTCH) and a dedicated control channel (DCCH), and
at least one of a shared channel control channel (SHCCH), a common control channel (CCCH) and a common traffic channel (CTCH), and another transport channel is a random access channel (RACH) associated with a set of logical channels including:
at least one of a dedicated traffic channel (DTCH) and a dedicated control channel (DCCH), and
at least one of a shared channel control channel (SHCCH) and a common control channel (CCCH);
said processor configured to process logical-channel data for the FACH and the RACH in data units having a bit size evenly divisible by N where N is an integer greater than three;
said processor configured to process logical-channel data for each logical channel within said set of logical channels associated with the FACH with a FACH MAC header that has a selected bit size equal to $M_f$ modulo N bits; and
said processor configured to process logical-channel data for each logical channel within said set of logical channels associated with the RACH with a RACH MAC header that has a selected bit size equal to $M_r$ modulo N bits.

2. The WTRU according to claim 1 wherein said processor is configured to process a FACH MAC header with each logical channel associated with the FACH and a RACH MAC header with each logical channel associated with the RACH where each respective MAC header has a Target Channel Type Field (TCTF) for data identifying a type of logical channel associated with the logical channel data.

3. The WTRU according to claim 2 wherein said processor is configured to process a FACH MAC header having a TCTF bit size of five bits for FACH MAC headers of the dedicated traffic channel (DTCH) and the dedicated control channel (DCCH) and a TCTF bit size of three bits for FACH MAC headers of the shared channel control channel (SHCCH), the common control channel (CCCH) and the common traffic channel (CTCH) and to process a RACH MAC header having a TCTF bit size of four bits for RACH MAC headers of the dedicated traffic channel (DTCH) and the dedicated control channel (DCCH) and a TCTF bit size of two bits for RACH MAC headers of the shared channel control channel (SHCCH) and the common control channel (CCCH).

4. The WTRU according to claim 3 wherein:
said processor is configured to process a FACH MAC header for:
the FACH DTCH having a TCTF coded with bits 01100;
the FACH DCCH having a TCTF coded with bits 01100;
the FACH SHCCH having a TCTF coded with bits 100;
the FACH CCCH having a TCTF coded with bits 001; and
the FACH CTCH having a TCTF coded with bits 010; and
said processor is configured to process a RACH MAC header for:
the RACH DTCH having a TCTF coded with bits 0100;
the RACH DCCH having a TCTF coded with bits 0100;
the RACH SHCCH having a TCTF coded with bits 10; and
the RACH CCCH having a TCTF coded with bits 00.

5. The WTRU according to claim 4 wherein said processor is configured to process logical-channel data for the FACH and the RACH where N equals eight in the form of data units made up of data octets and to process FACH MAC headers having a bit size of three modulo eight bits with each logical channel associated with the FACH and to process RACH MAC headers having a bit size of two modulo eight bits with each logical channel associated with the RACH.

6. The WTRU according to claim 1 wherein said processor is configured to process logical-channel data for the FACH and the RACH where N equals eight in the form of data units made up of data octets and to process FACH MAC headers having a bit size of three modulo eight bits with each logical channel associated with the FACH and to process RACH MAC headers having a bit size of two modulo eight bits with each logical channel associated with the RACH.

7. The WTRU according to claim 1 wherein said processor is configured to process data for transmission by associating a MAC header with respective FACH and RACH logical channels to provide the data from the MAC layer to the physical layer.

8. The WTRU according to claim 1 configured as a user equipment or a base station.

9. A wireless transmit receive unit (WTRU) for code division multiple access (CDMA) telecommunications comprising:
a processor configured to process data in a physical layer and a medium access control (MAC) layer such that the MAC layer communicates data with the physical layer via a plurality of transport channels, where one transport channel is a Time Division Duplex (TDD) forward access channel (FACH) associated with a set of logical channels including:
at least one of a dedicated traffic channel (DTCH) and a dedicated control channel (DCCH), and
at least one of a shared channel control channel (SHCCH), a common control channel (CCCH) and a common traffic channel (CTCH), and another transport channel is a TDD random access channel (RACH) associated with a set of logical channels including:
at least one of a dedicated traffic channel (DTCH) and a dedicated control channel (DCCH), and
at least one of a shared channel control channel (SHCCH) and a common control channel (CCCH);
said processor configured to associate a FACH MAC header with each logical channel within said set of logical channels associated with the FACH where each FACH MAC header has a Target Channel Type Field (TCTF) for data identifying a type of logical channel associated with the logical channel data such that the FACH MAC header TCFTs for the dedicated traffic channel (DTCH) and the dedicated control channel (DCCH) have a bit size of five bits and the FACH MAC header TCFTs for the shared channel control channel (SHCCH), the common control channel (CCCH) and the common traffic channel (CTCH) have a TCTF bit size of three bits; and
said processor configured to associate a RACH MAC header having a selected bit size with each logical channel within said set of logical channels associated with the RACH where each RACH MAC header has a Target Channel Type Field (TCTF) for data identifying a type of logical channel associated with the logical channel data such that the RACH MAC header TCFTs for the dedicated traffic channel (DTCH) and the dedicated control channel (DCCH) have a bit size of four bits and the RACH MAC header TCFTs for the shared channel control channel (SHCCH) and the common control channel (CCCH) have a TCTF bit size of two bits.

10. The WTRU according to claim 9 wherein:
said processor is configured to associate a FACH MAC header for:
the FACH DTCH having a TCTF coded with bits 01100;
the FACH DCCH having a TCTF coded with bits 01100;
the FACH SHCCH having a TCTF coded with bits 100;
the FACH CCCH having a TCTF coded with bits 001; and
the FACH CTCH having a TCTF coded with bits 010; and
said processor is configured to associate a RACH MAC header for:
the RACH DTCH having a TCTF coded with bits 0100;
the RACH DCCH having a TCTF coded with bits 0100;
the RACH SHCCH having a TCTF coded with bits 10; and
the RACH CCCH having a TCTF coded with bits 00.

11. The WTRU according to claim 9 wherein:
said processor is configured to process logical-channel data for the FACH and the RACH in data units comprised of data octets;
said processor is configured to provide logical-channel data for the FACH from the MAC layer to the physical layer as transport blocks of data, such that each transport block of data that includes a FACH MAC header and logical-channel data for the FACH has one of a finite number of transport block (TB) bit sizes where the transport block bit sizes are each of a size equal to three modulo eight bits; and
said processor is configured to provide logical-channel data for the RACH from the MAC layer to the physical layer as transport blocks of data, such that each transport block of data that includes a RACH MAC header and logical-channel data for the RACH has one of a finite number of transport block (TB) bit sizes where the transport block bit sizes are each of a size equal to two modulo eight bits.

12. The WTRU according to claim 11 wherein:
said processor is configured to associate a FACH MAC header for:
the FACH DTCH having a TCTF coded with bits 01100;
the FACH DCCH having a TCTF coded with bits 01100;
the FACH SHCCH having a TCTF coded with bits 100;

the FACH CCCH having a TCTF coded with bits 001; and the FACH CTCH having a TCTF coded with bits 010; and said processor is configured to associate a RACH MAC header for:

the RACH DTCH having a TCTF coded with bits 0100;
the RACH DCCH having a TCTF coded with bits 0100;
the RACH SHCCH having a TCTF coded with bits 10; and
the RACH CCCH having a TCTF coded with bits 00.

13. The WTRU according to claim 9 wherein said processor is configured to process data for transmission by associating a MAC header with respective FACH and RACH logical channels to provide the data from the MAC layer to the physical layer.

14. The WTRU according to claim 9 configured as a user equipment or a base station.

15. A wireless transmit receive unit (WTRU) for code division multiple access (CDMA) telecommunications comprising:

a processor configured to process data in a physical layer and a medium access control (MAC) layer such that the MAC layer communicates data with the physical layer via a plurality of transport channels, where one transport channel is a Time Division Duplex (TDD) forward access channel (FACH) associated with a set of logical channels including a dedicated traffic channel (DTCH), a dedicated control channel (DCCH), a shared channel control channel (SHCCH), a common control channel (CCCH) and a common traffic channel (CTCH) and another transport channel is a TDD random access channel (RACH) associated with a set of logical channels including a dedicated traffic channel (DTCH), a dedicated control channel (DCCH), a shared channel control channel (SHCCH) and a common control channel (CCCH);

said processor configured to process a MAC header with respective FACH and RACH logical channels where each MAC header has a Target Channel Type Field (TCTF); and said processor configured to process a MAC header for:
the FACH DTCH having a TCTF coded with bits 01100;
the FACH DCCH having a TCTF coded with bits 01100;
the FACH SHCCH having a TCTF coded with bits 100;
the FACH CCCH having a TCTF coded with bits 001;
the FACH CTCH having a TCTF coded with bits 010;
the RACH DTCH having a TCTF coded with bits 0100;
the RACH DCCH having a TCTF coded with bits 0100;
the RACH SHCCH having a TCTF coded with bits 10; and
the RACH CCCH having a TCTF coded with bits 00.

16. The WTRU according to claim 15 wherein said processor is configured to process data for transmission by associating a MAC header with respective FACH and RACH logical channels to provide the data from the MAC layer to the physical layer.

17. The WTRU according to claim 15 configured as a user equipment or a base station.

18. A method for code division multiple access (CDMA) telecommunications comprising:

providing a wireless transmit receive unit (WTRU) having a physical layer and a medium access control (MAC) layer configured such that the MAC layer communicates data with the physical layer via a plurality of transport channels, where one transport channel is a forward access channel (FACH) associated with a set of logical channels including:

at least one of a dedicated traffic channel (DTCH) and a dedicated control channel (DCCH), and at least one of a shared channel control channel (SHCCH), a common control channel (CCCH) and a common traffic channel (CTCH), and another transport channel is a random access channel (RACH) associated with a set of logical channels including:

at least one of a dedicated traffic channel (DTCH) and a dedicated control channel (DCCH), and at least one of a shared channel control channel (SHCCH) and a common control channel (CCCH);

processing logical-channel data for the FACH and the RACH in data units having a bit size evenly divisible by N where N is an integer greater than three;

processing logical-channel data for logical channels associated with the FACH with FACH MAC headers where each FACH MAC header has a bit size equal to $M_f$ modulo N bits; and processing logical-channel data for logical channels associated with the RACH with RACH MAC headers where each RACH MAC header has a bit size equal to $M_r$ modulo N bits.

19. The method according to claim 18 wherein the processing of respective MAC headers with logical channels associated with the FACH and the RACH includes providing a Target Channel Type Field (TCTF) for data identifying a type of logical channel associated with the logical channel data in each respective MAC header.

20. The method according to claim 19 wherein:

a FACH MAC header having a TCTF bit size of five bits is used for FACH MAC headers of the dedicated traffic channel (DTCH) and the dedicated control channel (DCCH);

a FACH MAC header having a TCTF bit size of three bits is used for FACH MAC headers of the shared channel control channel (SHCCH), the common control channel (CCCH) and the common traffic channel (CTCH);

a RACH MAC header having a TCTF bit size of four bits is used for RACH MAC headers of the dedicated traffic channel (DTCH) and the dedicated control channel (DCCH); and a RACH MAC header having a TCTF bit size of two bits is used for RACH MAC headers of the shared channel control channel (SHCCH) and the common control channel (CCCH).

21. The method according to claim 20 wherein:

a FACH MAC header for:
the FACH DTCH having a TCTF coded with bits 01100 is used;
the FACH DCCH having a TCTF coded with bits 01100 is used;
the FACH SHCCH having a TCTF coded with bits 100 is used;
the FACH CCCH having a TCTF coded with bits 001 is used; and
the FACH CTCH having a TCTF coded with bits 010 is used; and a RACH MAC header for:
the RACH DTCH having a TCTF coded with bits 0100 is used;
the RACH DCCH having a TCTF coded with bits 0100 is used;
the RACH SHCCH having a TCTF coded with bits 10 is used; and
the RACH CCCH having a TCTF coded with bits 00 is used.

22. The method according to claim 21 wherein logical-channel data for the FACH and the RACH is processed in the form of data units made up of data octets whereby N equals eight and wherein FACH MAC headers having a bit size of three modulo eight bits are used with each logical channel associated with the FACH and RACH MAC headers having a bit size of two modulo eight bits are used with each logical channel associated with the RACH.

23. A method for code division multiple access (CDMA) telecommunications comprising:
   providing a wireless transmit receive unit (WTRU) having a physical layer and a medium access control (MAC) layer, with the MAC layer providing data to the physical layer via a plurality of transport channels, where one transport channel is a Time Division Duplex (TDD) forward access channel (FACH) associated with a set of logical channels including:
      at least one of a dedicated traffic channel (DTCH) and a dedicated control channel (DCCH), and
      at least one of a shared channel control channel (SHCCH), a common control channel (CCCH) and a common traffic channel (CTCH), and another transport channel is a TDD random access channel (RACH) associated with a set of logical channels including:
      at least one of a dedicated traffic channel (DTCH) and a dedicated control channel (DCCH), and
      at least one of a shared channel control channel (SHCCH) and a common control channel (CCCH);
   associating FACH MAC headers having a selected bit size with logical channels associated with the FACH where each FACH MAC header has a Target Channel Type Field (TCTF) for data identifying a type of logical channel associated with the logical channel data such that the FACH MAC header TCFTs for the dedicated traffic channel (DTCH) and the dedicated control channel (DCCH) have a bit size of five bits and the FACH MAC header TCFTs for the shared channel control channel (SHCCH), the common control channel (CCCH) and the common traffic channel (CTCH) have a TCTF bit size of three bits; and
   associating RACH MAC headers having a selected bit size with logical channels associated with the RACH where each RACH MAC header has a Target Channel Type Field (TCTF) for data identifying a type of logical channel associated with the logical channel data such that the RACH MAC header TCFTs for the dedicated traffic channel (DTCH) and the dedicated control channel (DCCH) have a bit size of four bits and the RACH MAC header TCFTs for the shared channel control channel (SHCCH) and the common control channel (CCCH) have a TCTF bit size of two bits.

24. The method according to claim 23 wherein:
   a FACH MAC header for:
      the FACH DTCH having a TCTF coded with bits 01100 is used;
      the FACH DCCH having a TCTF coded with bits 01100 is used;
      the FACH SHCCH having a TCTF coded with bits 100 is used;
      the FACH CCCH having a TCTF coded with bits 001 is used; and
      the FACH CTCH having a TCTF coded with bits 010 is used; and
   a RACH MAC header for:
      the RACH DTCH having a TCTF coded with bits 0100 is used;
      the RACH DCCH having a TCTF coded with bits 0100 is used;
      the RACH SHCCH having a TCTF coded with bits 10 is used; and
      the RACH CCCH having a TCTF coded with bits 00 is used.

25. The method according to claim 23 wherein:
   logical-channel data for the FACH and the RACH is processed in data units comprised of data octets;
   logical-channel data for the FACH is provided from the MAC layer to the physical layer as transport blocks of data, such that each transport block of data that includes a FACH MAC header and logical-channel data for the FACH has one of a finite number of transport block (TB) bit sizes where the transport block bit sizes are each of a size equal to three modulo eight bits; and
   logical-channel data for the RACH is provided from the MAC layer to the physical layer as transport blocks of data, such that each transport block of data that includes a RACH MAC header and logical-channel data for the RACH has one of a finite number of transport block (TB) bit sizes where the transport block bit sizes are each of a size equal to two modulo eight bits.

26. The method according to claim 25 wherein:
   a FACH MAC header for:
      the FACH DTCH having a TCTF coded with bits 01100 is used;
      the FACH DCCH having a TCTF coded with bits 01100 is used;
      the FACH SHCCH having a TCTF coded with bits 100 is used;
      the FACH CCCH having a TCTF coded with bits 001 is used; and
      the FACH CTCH having a TCTF coded with bits 010 is used; and
   a RACH MAC header for:
      the RACH DTCH having a TCTF coded with bits 0100 is used;
      the RACH DCCH having a TCTF coded with bits 0100 is used;
      the RACH SHCCH having a TCTF coded with bits 10 is used; and
      the RACH CCCH having a TCTF coded with bits 00 is used.

27. A method for code division multiple access (CDMA) telecommunications comprising:
   providing a wireless transmit receive unit (WTRU) having a physical layer and a medium access control (MAC) layer, with the MAC layer providing data to the physical layer via a plurality of transport channels, where one transport channel is a Time Division Duplex (TDD) forward access channel (FACH) associated with a set of logical channels including a dedicated traffic channel (DTCH), a dedicated control channel (DCCH), a shared channel control channel (SHCCH), a common control channel (CCCH) and a common traffic channel (CTCH) and another transport channel is a TDD random access channel (RACH) associated with a set of logical channels including a dedicated traffic channel (DTCH), a dedicated control channel (DCCH), a shared channel control channel (SHCCH) and a common control channel (CCCH); and processing MAC headers with respective FACH and RACH logical channels where each MAC header has a Target Channel Type Field (TCTF) such that:

a FACH MAC header for:

the FACH DTCH having a TCTF coded with bits 01100 is used;

the FACH DCCH having a TCTF coded with bits 01100 is used;

the FACH SHCCH having a TCTF coded with bits 100 is used;

the FACH CCCH having a TCTF coded with bits 001 is used; and the FACH CTCH having a TCTF coded with bits 010 is used; and a RACH MAC header for:

the RACH DTCH having a TCTF coded with bits 0100 is used;

the RACH DCCH having a TCTF coded with bits 0100 is used;

the RACH SHCCH having a TCTF coded with bits 10 is used; and the RACH CCCH having a TCTF coded with bits 00 is used.

28. The method of claim 27 wherein data for transmission is processed by associating MAC headers with respective FACH and RACH logical channels to provide the data from the MAC layer to the physical layer.

* * * * *

UNITED STATES PATENT AND TRADEMARK OFFICE
CERTIFICATE OF CORRECTION

PATENT NO. : 7,881,266 B2
APPLICATION NO. : 12/539901
DATED : February 1, 2011
INVENTOR(S) : Stephen E. Terry It is certified that error appears in the above-identified patent and that said Letters Patent is hereby corrected as shown below:

IN THE SPECIFICATION

At column 3, line 63, after "TrCHs", delete "includes", and insert --include--.

At column 4, line 13, after "SHCCH and", delete "BCCH" and insert --DDCH--.

At column 6, line 32, after "mean RLC", delete "PDU's" and insert --PDUs--.

At column 7, line 10, after "(UM)", delete "PDU's" and insert --PDUs--.

At column 8, line 2, before "could", delete "PDU's" and insert --PDUs--.

At column 12, line 63, after "equal" insert --to--.

At column 13, line 2, after "divisible" insert --by--.

At column 16, line 5, after "header" delete "TCFTs" and insert --TCTFs--.

At column 16, line 8, after "header" delete "TCFTs" and insert --TCTFs--.

At column 16, line 18, after "header" delete "TCFTs" and insert --TCTFs--.

At column 16, line 21, after "header" delete "TCFTs" and insert --TCTFs--.

At column 19, line 35, after "header" delete "TCFTs" and insert --TCTFs--.

At column 19, line 38, after "header" delete "TCFTs" and insert --TCTFs--.

At column 19, line 47, after "header" delete "TCFTs" and insert --TCTFs--.

Signed and Sealed this
Twentieth Day of December, 2011

David J. Kappos
*Director of the United States Patent and Trademark Office*

At column 19, line 50, after "header" delete "TCFTs" and insert --TCTFs--.